UNITED STATES PATENT OFFICE.

JULIUS KANTOROWICZ, OF BRESLAU, GERMANY.

TREATING STARCH.

SPECIFICATION forming part of Letters Patent No. 578,566, dated March 9, 1897.

Application filed March 30, 1896. Serial No. 585,467. (No specimens.)

*To all whom it may concern:*

Be it known that I, JULIUS KANTOROWICZ, a subject of the King of Prussia, Emperor of Germany, residing at Breslau, Province of Silesia, Prussia, German Empire, have invented certain new and useful Improvements in Processes of Manufacturing a Water-Soluble Opened Starch, of which the following is a specification.

The object of this invention is to produce dry digested starch which can be dissolved in boiling water. This is accomplished by separating starch which has been digested in any desired manner from its solution, either by means of magnesium sulfate or by a freezing process, then cleaning, drying, and pulverizing it.

If starch be treated with alkalies or with solutions of hygroscopic salts, for example, chlorid of magnesium or chlorid of calcium, the result is liquid opened or digested starch, *Flüssige aufgeschlossene Stärke*, or vegetable glue, *Pflanzenleim*. This digested starch or vegetable glue is easily soluble in boiling water. Hitherto, however, it has always been necessary to export and apply it in a liquid condition; for should it be allowed to dry by oversight the horny dry starch resulting would no longer be soluble, even if boiled in water for several hours. Such dried-up vegetable glue has up to the present time been thrown away as useless.

I have succeeded in effecting the drying of the starch rendered soluble by the wet process without the starch losing its solubility in boiling water. This was effected by treating the above-mentioned solution of *aufgeschlossene* starch with magnesium sulfate or freezing the solution, the starch precipitated by the one or the other process being separated from the liquid and then pulverized. The pulverizing is absolutely necessary to the process. I have therefore discovered that the starch so separated, dried, and pulverized can be dissolved by boiling or steeping it in boiling water.

That this process is of great technical value appears from the fact that the *Pflanzenleim* can only be produced in a twenty to twenty-five per cent. solution, because by the action of the alkalies on stronger solutions or by the concentration of the diluted solution a tough, viscous, and practically useless product results. By the present process, therefore, there is a saving of at least seventy-five per cent. in space, weight, packing, and duties. Besides this the product may be kept in stock for any length of time without spoiling.

The process in practice is carried out as follows: Starch of any kind is digested by means of alkalies. The alkali is neutralized and the starch separated from the neutralized solution by means of magnesium sulfate or by a freezing process. The salt solution is then drawn off, the starch washed with clean water until all traces of salt have been removed, and then the precipitated starch is dried and finally ground.

Making soluble starch by the wet process is a known process and fully described. For instance, in the work of Polleyn, *Appreturmittel*, Vienna, Hartleben, (1886,) pages 170 and 171. It is therefore thought unnecessary to describe this part of the process fully in the specification.

The neutralizing of the starch solution is effected by the application of an acid—for example, muriatic acid—until the action of the solution on litmus-paper is neutral.

The neutral solution is placed in a vessel provided with means for stirring, and magnesium sulfate is added until the starch is completely precipitated. The completion of the process is recognizable by the appearance of the starch solution, which loses its syrup-like consistency and becomes watery. The salt solution is drawn off, the precipitated starch washed well with cold water in order to remove all adhering salts, and finally dried on a drying-hearth or in other suitable drying apparatus, which works with less than sixty per cent. Celsius, and finally is finely ground.

The starch must be separated from the solution, as the intention of the process is to produce from the solution of *aufgeschlossene* starch a dry starch soluble in water.

The reaction which takes place is not known. An elementary quantitative analysis, effected by burning the substances to be analyzed by means of oxidizing agents and weighing the products of combustion, shows no essential difference between the percental composition of my starch and that of raw starch. Possibly the two products are isometrics, but not chemically identical.

The product obtained shows the same chemical properties as the raw starch, but other physical properties than does the raw starch. The former is just as insoluble in cold water as raw starch, but soluble in boiling water, alkalies, and strong solutions, (from 30° to 40° Baumé,) hygroscopic salts, as chlorid of zinc, chlorid of calcium, and chlorid of magnesium. It shows the same intense-blue color when treated with iodine, and when suspended in water the same resistance to microbes producing rot and the same want of adhesiveness. The physical properties of this dry *aufgeschlossene* starch are, however, quite otherwise than those of the raw starch applied in its production—for example, potato starch. While the latter, when boiled with a ten-times greater quantity of water, yields a thick paste, the former with like proportions produces a thin liquid solution. The adhesiveness is nearly as large as that of animal glue, while the adhesiveness of the ordinary potato-starch paste is never sufficient for pasting a somewhat strongly-satinized paper. The product also is far greater than with raw starch. Notwithstanding these technical advantages, *aufgeschlossene* dry starch soluble in boiling water has hitherto been unknown in industry, the process now described having first opened a way for its production.

While I have limited my claim to the use of magnesium sulfate, I would have it understood that I consider freezing in the same process to be the equivalent of the same.

Having thus described my invention, what I claim as new, and desire to secure by Letters Patent, is—

The process of producing dry digested starch, which is soluble in water, which consists in subjecting the digested starch to the action of magnesium sulfate for separating it from its solution, washing the separated starch, drying it, and finally pulverizing it, substantially as herein set forth.

In witness whereof I have hereunto set my hand in presence of two witnesses.

JULIUS KANTOROWICZ.

Witnesses:
MARTIN MEYER,
ERNST VEDTZ.